Feb. 11, 1958  E. J. CLOVIS  2,823,000
BRACKET
Filed April 10, 1953
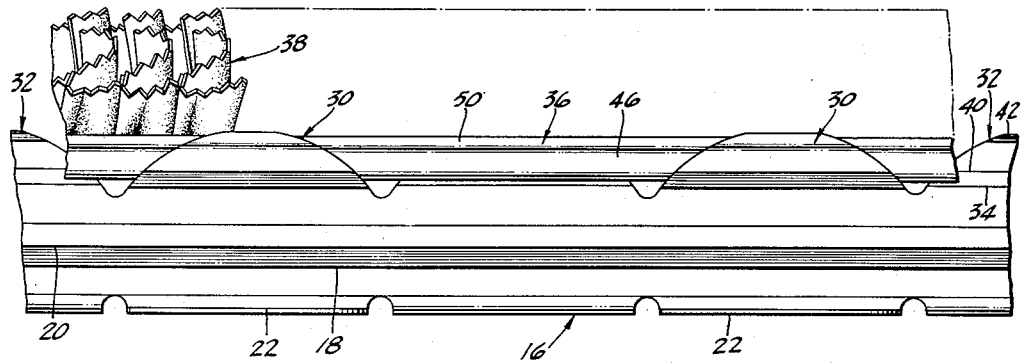
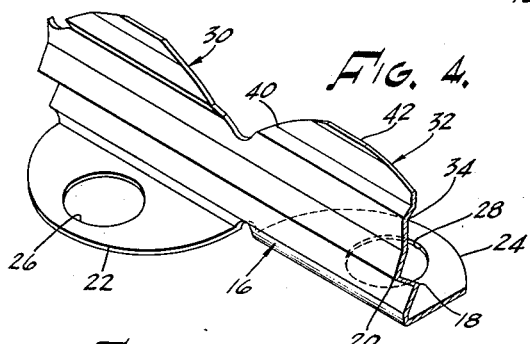
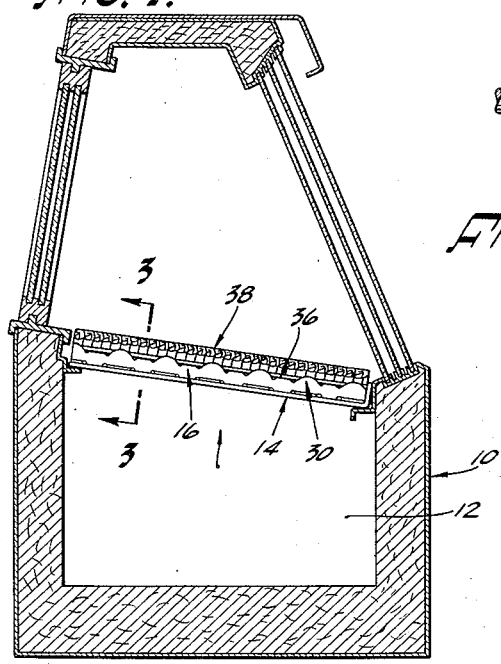
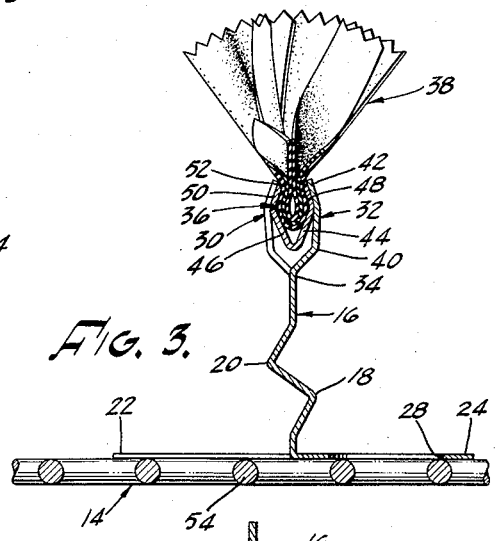
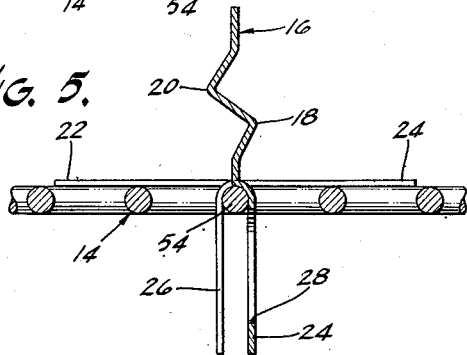
INVENTOR.
EDWARD J. CLOVIS
BY
ATTORNEYS

2,823,000
Patented Feb. 11, 1958

2,823,000
BRACKET

Edward J. Clovis, Fullerton, Calif., assignor to McClintock Manufacturing Co., Los Angeles, Calif., a corporation of California Application April 10, 1953, Serial No. 348,006

2 Claims. (Cl. 248—33)

This invention relates to an improved bracket for supporting rubber greens.

It is the custom in displaying food and particularly meats in a refrigerated showcase to utilize decorative strips called rubber greens to divide the display area into sections and for decorative purposes. It is the principal object of this invention to provide suitable means for releasably supporting the rubber greens.

It is still a further object of this invention to provide bracket means for supporting rubber greens which will easily and quickly grasp or release same.

A further object of this invention is to provide a suitable bracket which will provide a minimum of interference with flow of air through the showcase.

Other objects and advantages will be readily apparent from the following description.

In the drawings:

Figure 1 is a side elevation in section of a showcase utilizing a bracket embodying this invention.

Figure 2 is a side elevation of the bracket.

Figure 3 is a section taken along line 3—3 of Figure 1.

Figure 4 is a perspective view of the bracket.

Figure 5 is a diagrammatic view of the lower portion of the bracket illustrating the mounting thereof.

A showcase, generally designated 10, is illustrated for the purpose of indicating the functioning of the bracket. The showcase illustrated is the type wherein cold air is moved from a space 12 below the display rack 14 through the rack and about the meat or other goods which is supported in suitable trays supported upon the rack. Of course, many different types of showcases are in use in which this bracket may be utilized.

The bracket 16 in this embodiment is a metal stamping of a suitable spring material which has been crimped as at 18 and 20 to form ribs, one on either side of the central plane of the bracket. At the base of the bracket ears 22 and 24 are provided normal to and on opposite sides of the central plane of the bracket. These ears are placed in this alternate manner along the length of the bracket forming a base therefore. The ears are each provided with a central aperture, such as 26 and 28, to permit air flow through the ears and to minimize the disruption of air flow. At the upper extremity of the bracket spring clips, such as 30 and 32, are formed on either side of the central plane of the bracket. For example, clip 32 is formed by crimping the bracket as at 34 outwardly and upwardly a distance equal to substantially one half the width of the base 36 of the rubber green 38 where the clip is again bent as at 40 upwardly in a plane parallel to the central plane of the bracket and has the tip 42 inclined toward the central plane of the bracket. The clip 30 is formed in the same manner although on the opposite side of the central plane. Clips similar to 30 and 32 are alternately positioned along the upper edge of the bracket and form a holding means for the base 36 of the rubber green 38 which is inserted along the central plane of the bracket forcing the clips apart by means of the diverging faces 44 and 46 thereon until the tips, such as 42 of the clips, reach the converging upper extremities 48 and 50 of base 36 where the clips are urged toward one another thereby releasably holding base 36. The converging faces 48 and 50 secure the rubber portion 52 therebetween, which rubber is arranged therein in a suitable decorative design.

In this manner a support is provided for releasably mounting the decorative rubber green in bracket 16. As seen in Figure 5, some of the ears, such as 24 and 26, may be bent downwardly about one of rods 54 of rack 14, preferably at each end of the bracket, while the remaining ears corresponding to ears 24 and 26 remain normal to the central plane of the bracket providing a support for the bracket.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:

1. A bracket for supporting a rubber green in a refrigerated show case comprising an elongated upright body portion having a base at its lower extremity and an upwardly open pocket at its upper extremity, said base being defined by a series of coplanar ears extending from opposite sides of the body portion in spaced apart relation lengthwise of said body portion with the space between each neighboring pair of ears on one side of the body portion in transverse alignment with an ear on the opposite side of the body portion, each of said ears having an open area centrally of its periphery, and said pocket being defined by a second series of ears extending from opposite sides of said body portion in spaced apart relation lengthwise of said body portion with the space between each neighboring pair of ears in said second series in transverse alignment with an ear of said series on the opposite side of said body portion, and each of said ears of said second series presenting an upright portion substantially parallel to a plane perpendicular to and containing the longitudinal median of said base.

2. A bracket for supporting a rubber green in a refrigerated show case as set forth in claim 1, wherein said upright body portion is crimped along its longitudinal axis in at least two vertically spaced positions forming strengthening ribs projecting from opposite sides of said body portion.

References Cited in the file of this patent

UNITED STATES PATENTS

| | | |
|---|---|---|
| 334,981 | Rampe | Jan. 26, 1886 |
| 1,317,589 | Noziska | Sept. 30, 1919 |
| 1,395,633 | Englehardt | Nov. 1, 1921 |
| 1,396,892 | Sieloff | Nov. 15, 1921 |
| 1,604,621 | Wallace | Oct. 26, 1926 |
| 1,719,503 | Egan | July 2, 1929 |
| 1,731,692 | Weindel | Oct. 15, 1929 |
| 1,893,594 | Oestreich | Jan. 10, 1933 |